May 1, 1951 — K. R. KALTENBACH — 2,551,009
GOLF CART
Filed June 26, 1948 — 4 Sheets-Sheet 3
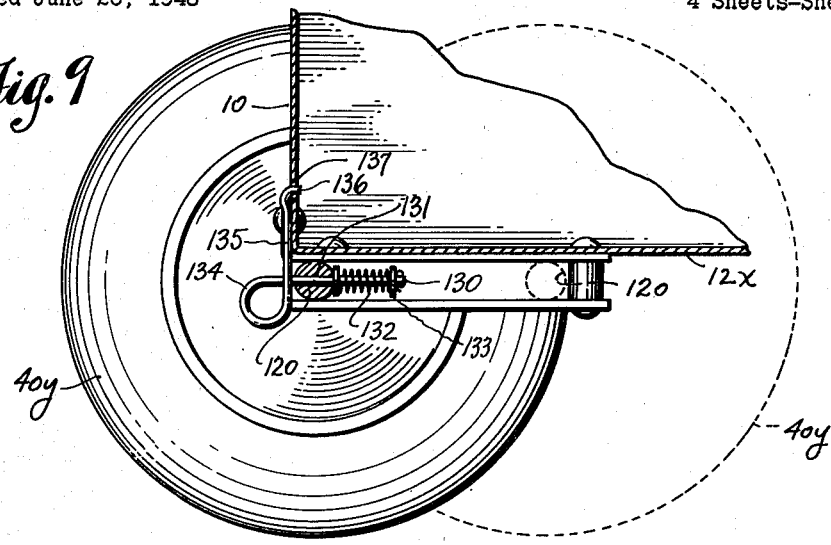
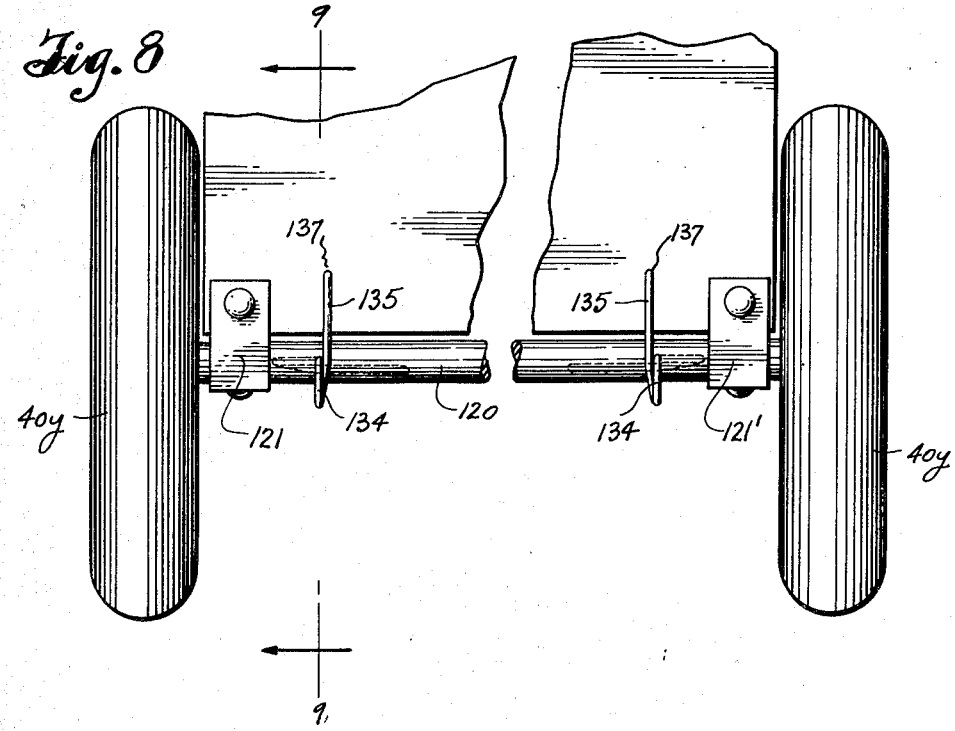
INVENTOR.
KURT R. KALTENBACH
BY
Cook & Robinson
ATTORNEYS May 1, 1951 K. R. KALTENBACH 2,551,009
GOLF CART
Filed June 26, 1948 4 Sheets-Sheet 4
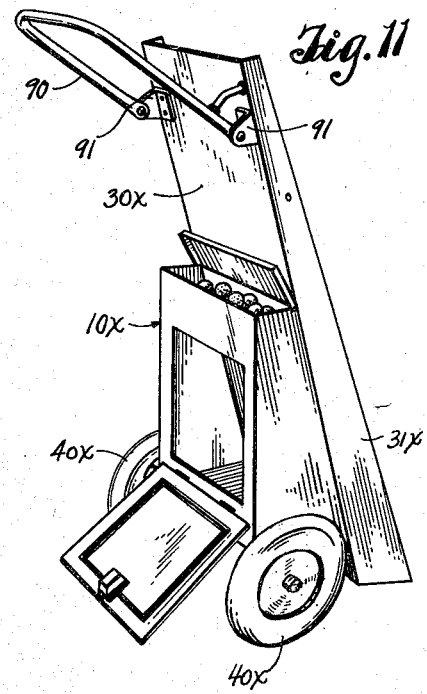
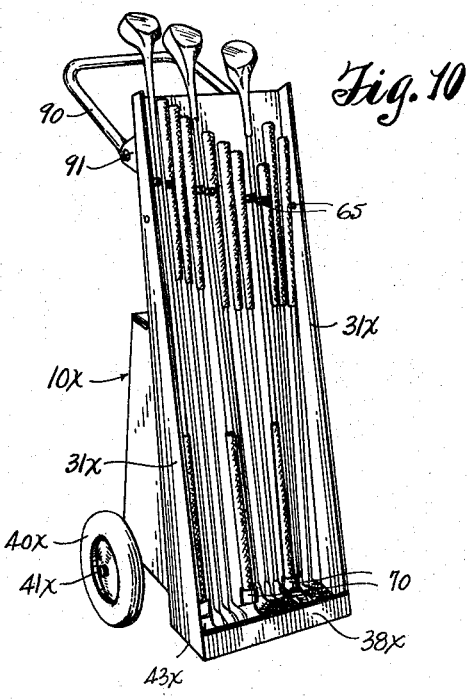
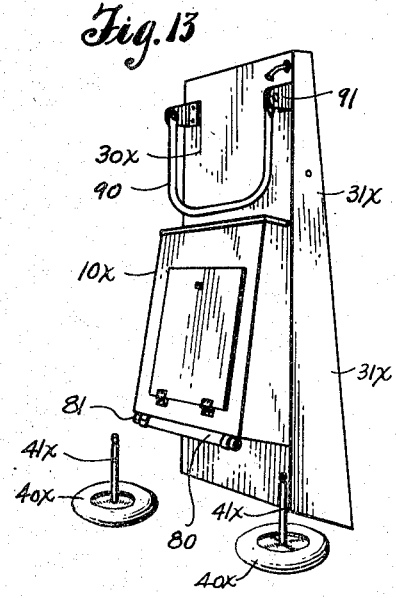
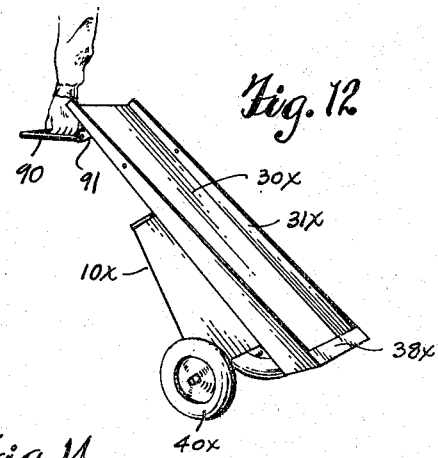
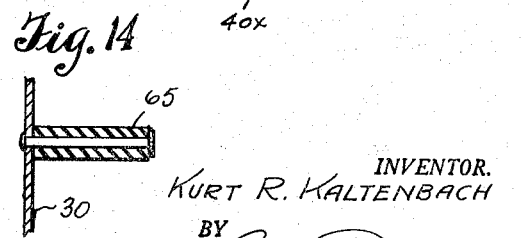
INVENTOR.
KURT R. KALTENBACH
BY
Cook & Robinson
ATTORNEYS Patented May 1, 1951

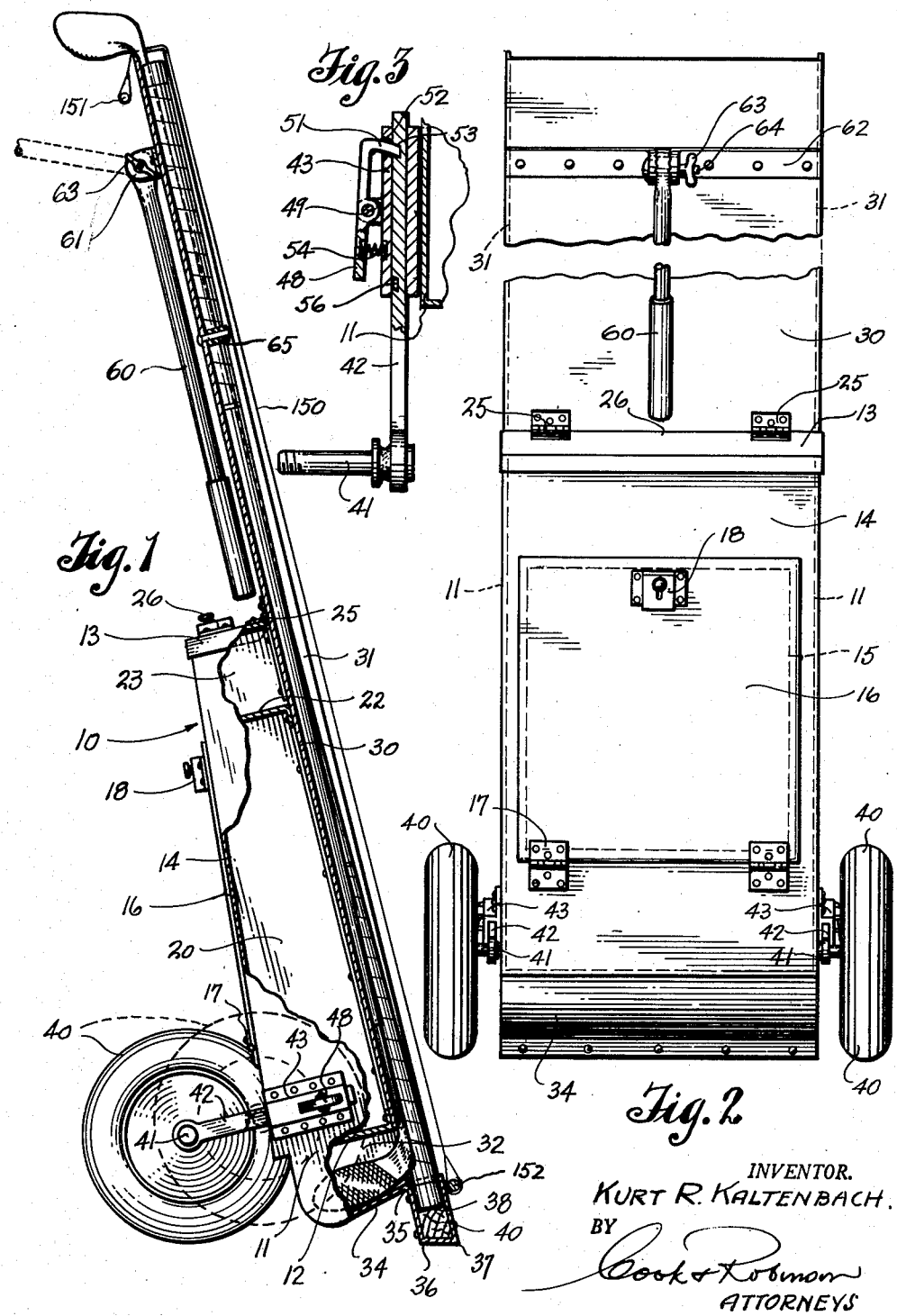

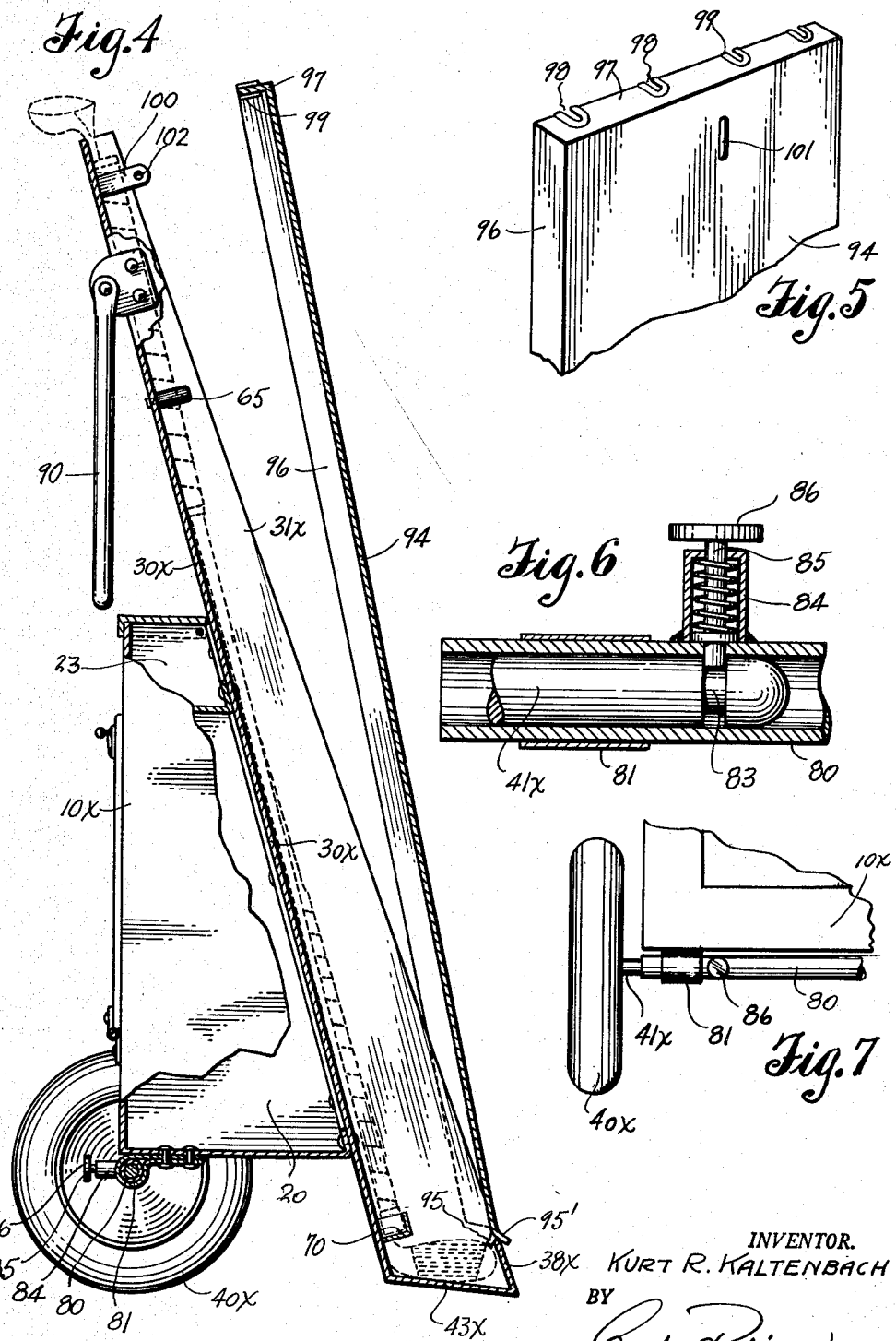

2,551,009

UNITED STATES PATENT OFFICE 2,551,009

GOLF CART

Kurt R. Kaltenbach, Seattle, Wash.

Application June 26, 1948, Serial No. 35,463

2 Claims. (Cl. 280—51)

This invention relates to improvements in what are generally known as "golf carts" and has reference more particularly to wheeled carts designed for the orderly holding of golf clubs and for their transportation over the golf course in lieu of carrying them in the usual form of golf bag.

It is the principal object of this invention to provide a cart of the above stated character embodying therein a club compartment for holding a large assortment of clubs, a jacket storage compartment of substantial dimensions and a ball holding compartment; all being of such dimensions and arranged in such manner that the cart may be readily stored within a locker of standard size.

It is also an object of the invention to provide a golf cart of the character above stated, wherein the wheels are adjustably mounted to permit them to be disposed either at an extended position for most satisfactory transportation, or at a retracted position for convenience in storage of the cart.

Other objects of the invention reside in the detail of construction of parts, and in their combination and mode of use, as hereinafter fully described.

In accomplishing the above mentioned and other objects of the invention, I have provided the improved detailed construction, the preferred forms of which are illustrated in the accompanying drawings, wherein:

Fig. 1 is a side view of a golf cart embodying the novel features of the present invention; parts of the structure being broken away for better showing and understanding.

Fig. 2 is a back view of the same.

Fig. 3 is a sectional detail showing one of the wheel mounting bars and its holding means.

Fig. 4 is a side elevation, and sectional view of a cart of an alternative form of construction, and showing therein the cover member for the club compartment in a lifted position.

Fig. 5 is a perspective view of the upper end portion of the cover member for the club compartment.

Fig. 6 is an enlarged, sectional detail of a portion of a wheel mounting axle and its retaining latch.

Fig. 7 is a back view of a portion of the cart showing the manner of mounting the ground wheels.

Fig. 8 is a rear elevation of a portion of a cart showing an alternative means for mounting the ground wheels.

Fig. 9 is a sectional detail taken on the line 9—9 in Fig. 8.

Fig. 10 is a perspective view of the cart shown in Fig. 4, and illustrating the arrangement of clubs in the club compartment.

Fig. 11 is a back view of the cart of Fig. 4.

Fig. 12 is a perspective view indicating the manner of wheeling the cart.

Fig. 13 is a perspective view of the cart of Fig. 4, showing the wheels demounted and handle collapsed for the purpose of storing the device in a locker.

Fig. 14 is a detail of a club spacing stud.

Referring more in detail to the drawings:

The cart of Fig. 1 is now the preferred form because of its being more compact and therefore more easily disposed within a locker of standard dimensions. The device, as shown, comprises a rigid frame structure wherein the various compartments previously mentioned are embodied, to the lower end of which ground wheels are attached for easy transportation of the device, and to the upper end of which a handle is fixed for adjustment from a collapsed position to an extended position that will best suit the user.

The frame structure, in this instance, comprises a substantially box-like housing 10, formed by opposite side walls 11—11, a bottom wall 12, top wall 13, and back wall 14. The back wall is formed with an opening 15, which is equipped with a door 16, as best shown in Fig. 2. The door is attached at its lower edge to the wall 14 by means of hinges 17 and is adapted to be held in closed position by a latch 18 which may be of any suitable type. The opening 15 provides access to an enclosed compartment 20, suitable for holding a jacket, coat, and other small articles.

Fixed in the upper end portion of the housing 10, is a horizontal partition 22, that sets off a ball compartment 23 above it, this compartment being covered by the upper end wall 13 of the housing, which wall is attached by hinges 25 for movement between open and closed positions. This hinged member may, if desired, be equipped with a suitable latch, as at 26, for retaining it in a closed position.

The housing 10 is normally disposed in an upright position, or upwardly inclined position, as indicated in Fig. 1, and it is riveted or otherwise permanently fixed, as shown in Fig. 1, to the bottom or back of a flat metal plate 30, which forms the bottom of the club-containing compartment. The plate 30 is of the same width as the housing 10, but extends substantially above it, as will be clearly understood by reference to Fig. 1. Along its opposite side edges, the plate 30 is equipped with outturned flanges 31, which form the sides of the compartment. It is to be observed also, by reference to Fig. 1, that the opposite side walls 11—11 of the housing 10 extend below the bottom 12 of the housing to form the opposite side walls of a pocket 32, within which the head portions of the irons are to be disposed, as will be understood by reference to Fig. 1. The back and bottom of the pocket 32 are closed by a wall strip 34, fixed between the side walls. The forward end of this strip is bent downwardly in the plane of the plate 30, as at 35, then forwardly as at 36, then upwardly as at 37, providing a transverse upwardly opening trough 38 for the reception of the lower ends of certain of the golf club shafts as presently explained. The bottom of the trough is fitted with a wooden strip 40, to give strength and rigidity thereto.

The club compartment that is formed by the bottom plate 30, its opposite side flanges 31—31, and the trough portion 38, can be covered if such is desired, by means which will later be described in connection with the device of Fig. 4.

The frame structure of the cart above described is equipped at opposite sides of its lower end with ground wheels 40—40, each of which is revolvable on a stub axle 41, that is fixed as shown in Fig. 3 to one end of a slide bar 42. The bars 42—42 are adjustably held in guide housings 43—43 that are fixed, respectively, to the opposite side walls of the housing 10, adjacent its lower end, and extend rearwardly from the housing, as will be understood by reference to Fig. 1.

The over-all distance from outside to outside of the wheels should be slightly less than the width of the ordinary locker of standard dimensions. Thus the cart, with wheels attached, may be set within the locker. However, to decrease the over-all depth of the cart so that it will come within the depth of the standard locker, the wheels may be adjusted as from the full line position shown in Fig. 1, to the dotted line position. This adjustment may be accomplished by shifting the bars 42 forwardly in their guides 43.

To hold the bars 42 in set positions of adjustment, I provide a latch lever 48 on each of the guide housings 43. Each lever is supported pivotally between its ends as at 49 in Fig. 3, and at one end has an inturned finger 51 adapted to project through a hole 52 in the housing and to seat within a notch 53 in the bar, thus to lock the bar in an extended position. A spring 54 disposed under compression between the guide 43 and lever 48, acts to yieldingly return the latch engaged. However, by depression of the lever, the latch finger 51 will be disengaged from the bar notch and the bar may then be shifted inwardly and locked at its inward position of adjustment by seating the finger 51 in another notch in the bar, designated at 56.

The wheels 40—40 may be of any suitable form of construction but it is preferred that they be equipped with pneumatic tires of the character illustrated. The mounting means for the wheels provides that they will be held in axial alignment and at a position most satisfactory for their use.

For easy and convenient wheeling of the cart, it is equipped at the back side and near the upper end of the frame with a handle 60. This comprises a straight bar that has one end portion pivoted between ears 61 that are fixed to a cross strip 62 riveted to the back side of the plate 30 near its upper end, as shown in Fig. 2. A wing nut 63 is applied to a bolt 64, that pivotally secures the handle, and this nut may be tightened to clamp and hold the handle 60 at any position of adjustment that best suits the user.

When the golf clubs of a set are arranged in the club compartment as has been shown in Fig. 1, the "irons" are disposed with shafts in upright position, and with the toe portions of each iron head turned rearwardly, and extended within the pocket 32 formed below the lower end of the housing 10. It is preferred in such an arrangement that the irons be grouped, for example, as shown in Fig. 10, and that the wooden clubs be located between the various groups of irons. It is the intent also that the wooden clubs be disposed with the grip ends down and the club heads extended above the upper end of the compartment. The lower ends of the shafts of the wooden clubs are seated on the trough 38, and the clubs are held in their various groups between short studs or posts 65 that are fixed in the bottom plate 30 near the upper end of the compartment. Preferably these posts are rubber covered, as shown in Fig. 14, to afford better gripping action and also to eliminate marring the club shafts.

The cart of modified form shown in Figs 4 to 12 corresponds to that of Fig. 1, in use and relative arrangement of parts, but not in details of construction. Its frame structure comprises a housing 10x, corresponding to housing 10 of the device of Fig. 1, and providing similar jacket and ball compartments therein. The club compartment is formed by a flat bottom plate 30x that is fixed upon the housing 10x, to extend substantially above, and also below the same. This plate is also formed with forwardly turned flanges 31x at its opposite edges, and a forwardly directed lower end wall 43x with upturned forward edge flange 38x. In use of this device, the golf clubs are disposed in the club compartment as best illustrated in Fig. 10, with the heads of irons resting upon the bottom 43x, and their shafts extended upright and held in groups, between posts 65 fixed in the bottom plate 30x, as in the device of Fig. 1. In this device, the club heads extend forwardly and engage against the upturned flange 38x.

Wooden clubs are applied as seen in Fig. 10, in inverted position. The lower ends of the club shafts are seated in cups or pockets 70 that are fixed to the bottom wall 30x near its lower end. The upper ends of these clubs extend above the top edge of the bottom plate as indicated.

For wheeling the cart, it is equipped with a set of ground wheels 40x—40x. Each of these is equipped with a spindle shaft 41x. These shafts are removably applied within the opposite end portions of a tube 80 that is fixed rigidly to the bottom of the housing 10x along its rear lower corner as best shown in Fig. 13. The tube may be suitably held by straps, designated at 81, or by other means.

In order that this device may be reduced in width for storage, the wheels are demountable from the cross tube 80. It is shown in Fig. 6 that the spindle shafts 41x are formed about their inner end portions with encircling channels 83, and that spring pressed latch pins 85 are mounted in guides 84 fixed on the tube, to engage at their inner ends in the channels to retain the spindles in place. At their outer ends, the pins 85 have heads 86 whereby they may be pulled outwardly to insert them for the spindle channels 83, thus to release the wheels for dismounting, as seen in Fig. 13.

At its upper end the frame is equipped with a U-shaped handle 90, pivoted on brackets 91 that may be fixed to the side flanges 31x of the club compartment as in Fig. 4, or to the back wall of the compartment as in Fig. 11.

To cover the club compartment for the protection of clubs, I provide a cover plate 94 as shown in Fig. 4. This is formed with prongs 95—95' along its lower end, that are turned forwardly and rearwardly, to engage upon the top edge of the flange 38x as seen in Fig. 4. Along its side edges, the cover plate has down-turned flanges 96 adapted to overlap the side flanges 31x when the cover is in closed position, and across its upper end has a back turned flange 97 formed with notches 98 through which the upper ends of the wooden clubs may extend. Preferably these notches are rubber covered, as shown at 99 in Fig. 5.

To hold the cover plate in place, I have fixed a post 100 to the upper end of the bottom plate 30x, that is adapted to extend through a slot or opening 101 (see Fig. 5) in the cover plate and this post is formed at its outer end with a hole 102 to receive a lock.

In Figs. 8 and 9, I have illustrated an alternative means for mounting the ground wheels 40 on carts of the kinds described. In this form, the ground wheels 40y are revolubly mounted on opposite ends of a cross axle 120.

The axle is supported adjacent its opposite ends in guideways 121 and 121' that are fixed to the bottom wall 12x of the housing 10, adjacent opposite sides thereof. This axle may be held by the guideways in a position, as shown in Fig. 9, closely adjacent the rear ends of the guideways, for normal use of the cart, and it may be moved forwardly as to the dotted line showing, to dispose the wheels in position for storage of the cart in a locker.

To hold the axle and wheels in position of Fig. 9 for normal use of the cart, I provide the axle with latches adjacent its opposite ends. Each latch comprises a piece of wire formed with a horizontal leg 130 extended through a hole 131 in the axle and equipped along its end with a coiled spring 132 held by washer 133. At the rear side of the axle, the wire is formed in a loop 134 and then extends upwardly, as a leg 135, with inturned upper end 136. The inturned end 136 may be seated in a hole 137 in the back wall of the housing.

To release the axle for forward adjustment, the loops 134 are grasped and by pulling rearwardly thereon against the tension of springs 132, the ends 136 are unseated from the holes 137 and the legs 135 turned to horizontal positions, disengaged from the housing 10 and therefore freeing the axle for its forward movement.

The wheel mounting of Fig. 9 is applicable to any of the carts described.

In lieu of covering the clubs with a plate or cover member of the kind shown at 94 in Fig. 4, it is anticipated that a strip of thin, transparent plastic might be used, as indicated in Fig. 1, wherein such a strip is designated by numeral 150 and it is shown as equipped at upper and lower ends with cross rods 151 and 152 as weights to hold it in place. This strip would be equipped at near its upper ends with openings to receive the head portions of the wooden clubs therethrough when the strip is draped over the cart as indicated.

Having thus described my invention, what I claim as new therein and desire to secure by Letters Patent is:

1. A cart of the character described comprising a frame structure, a pair of supporting wheels attached to the structure at its lower end and a handle member attached to the frame at its upper end; said frame structure comprising a shallow, substantially upright and forwardly facing golf club compartment, with a bottom wall against which golf clubs may be laid side by side in upright position, and formed across its lower end with an upwardly opening trough in which the handle ends of club shafts may be received and contained for the support of those clubs in the compartment and there being a pocket across the lower end of and opening into the club compartment above said trough designed to receive the heads of iron clubs as supported in upright position in the club compartment.

2. A golf cart comprising a frame structure having a box-like housing across the lower end portion thereof, providing a rearwardly opening storage compartment, and a substantially upright, shallow and forwardly opening club compartment across the front thereof designed to contain a set of golf clubs therein in upright, side by side relationship, and said club compartment having an upwardly opening trough across its lower end to receive and retain the lower ends of the clubs therein for their support in the compartment, and there being a pocket across the lower end of and opening into the club compartment to receive the heads of iron clubs as supported in the club compartment, wheel mountings on the opposite sides of the housing, bars forwardly and rearwardly adjustable in said mountings, ground wheels mounted by said bars for the wheeled support of the cart when the frame is rearwardly inclined, and to coact with the lower end of the frame to support it in upright position when standing.

KURT R. KALTENBACH.

REFERENCES CITED

The following references are of record in the file of this patent:

UNITED STATES PATENTS

| Number | Name | Date |
|---|---|---|
| 1,176,876 | Vartabedian | Mar. 28, 1916 |
| 1,428,853 | Gourley | Mar. 11, 1924 |
| 1,581,061 | Johnston | Apr. 13, 1926 |
| 2,262,298 | Procter | Nov. 11, 1941 |
| 2,326,482 | Moffitt | Aug. 10, 1943 |
| 2,411,965 | Hartung | Dec. 3, 1946 |
| 2,428,853 | Procter | Oct. 14, 1947 |
| 2,438,078 | Sutphen | Mar. 16, 1948 |